US011401486B2

(12) United States Patent
Nakamura et al.

(10) Patent No.: US 11,401,486 B2
(45) Date of Patent: *Aug. 2, 2022

(54) SOLVENT COMPOSITION, CLEANING METHOD AND METHOD OF FORMING A COATING FILM

(71) Applicant: AGC Inc., Chiyoda-ku (JP)

(72) Inventors: Masahiko Nakamura, Chiyoda-ku (JP); Hidekazu Okamoto, Chiyoda-ku (JP); Masaaki Tsuzaki, Chiyoda-ku (JP); Hiroaki Mitsuoka, Chiyoda-ku (JP); Satoko Itoh, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,547

(22) Filed: Sep. 18, 2020

(65) Prior Publication Data

US 2021/0002590 A1 Jan. 7, 2021

Related U.S. Application Data

(63) Continuation of application No. 15/911,298, filed on Mar. 5, 2018, now Pat. No. 10,815,452, which is a continuation of application No. PCT/JP2016/075641, filed on Sep. 1, 2016.

(30) Foreign Application Priority Data

Sep. 4, 2015 (JP) .............................. JP2015-174528

(51) Int. Cl.
| | |
|---|---|
| C11D 7/50 | (2006.01) |
| C09D 201/00 | (2006.01) |
| C11D 7/30 | (2006.01) |
| C23G 5/028 | (2006.01) |
| C09D 7/20 | (2018.01) |
| B08B 3/08 | (2006.01) |
| C09D 7/63 | (2018.01) |
| C11D 11/00 | (2006.01) |

(52) U.S. Cl.
CPC ............. *C11D 7/5018* (2013.01); *B08B 3/08* (2013.01); *C09D 7/20* (2018.01); *C09D 7/63* (2018.01); *C09D 201/00* (2013.01); *C11D 7/30* (2013.01); *C11D 7/50* (2013.01); *C11D 11/0017* (2013.01); *C23G 5/02809* (2013.01); *C23G 5/02841* (2013.01); *C23G 5/02858* (2013.01)

(58) Field of Classification Search
CPC .......... C11D 7/5018; C11D 7/50; C11D 7/30; C11D 11/0017; C09D 201/00; C09D 7/20; C09D 7/63; C23G 5/02858; C23G 5/02809; C23G 5/02841; B08B 3/08
USPC ........................................ 510/405; 252/364
See application file for complete search history.

(56) References Cited

U.S. PATENT DOCUMENTS

| | | | | |
|---|---|---|---|---|
| 10,029,961 | B2 * | 7/2018 | Deur-Bert | ................ B01D 3/36 |
| 10,815,452 | B2 * | 10/2020 | Nakamura | ........... C11D 7/5018 |
| 11,254,824 | B2 * | 2/2022 | Mitsuoka | ................. C11D 7/26 |
| 2009/0242832 | A1 | 10/2009 | Pham et al. | |
| 2011/0218370 | A1 | 9/2011 | Elsheikh et al. | |
| 2012/0107513 | A1 | 5/2012 | Tamai et al. | |
| 2012/0138841 | A1 | 6/2012 | Hulse et al. | |
| 2013/0131404 | A1 | 5/2013 | Hulse et al. | |
| 2013/0150632 | A1 | 6/2013 | Zhai et al. | |
| 2014/0171698 | A1 | 6/2014 | Elsheikh et al. | |
| 2014/0228600 | A1 | 8/2014 | Elsheikh et al. | |
| 2014/0261565 | A1 | 9/2014 | Hulse et al. | |
| 2015/0045590 | A1 | 2/2015 | Nair et al. | |
| 2015/0152362 | A1 | 6/2015 | Hulse et al. | |
| 2017/0297982 | A1 * | 10/2017 | Deur-Bert | ............... C01B 7/191 |
| 2021/0087502 | A1 * | 3/2021 | Ito | ........................ C11D 7/5018 |

FOREIGN PATENT DOCUMENTS

| | | |
|---|---|---|
| CA | 2 845 948 A1 | 9/2014 |
| CN | 101555190 | 10/2009 |
| CN | 101687738 A | 3/2010 |
| CN | 102471638 | 5/2012 |
| CN | 103313961 | 9/2013 |
| CN | 104047010 | 9/2014 |
| EP | 2 107 048 A1 | 10/2009 |
| EP | 2 455 432 A1 | 5/2012 |
| EP | 2 778 259 A2 | 9/2014 |
| JP | 2009-242799 | 10/2009 |
| JP | 2010-248443 | 11/2010 |
| JP | 2011-046688 | 3/2011 |

(Continued)

OTHER PUBLICATIONS

International Search Report dated Oct. 4, 2016 in PCT/JP2016/075641 filed Sep. 1, 2016 (with English Translation).
Written Opinion dated Oct. 4, 2016 in PCT/JP2016/075641 filed Sep. 1, 2016.
Journal of Organic Chemistry, 1989, vol. 54, 4 pages.

*Primary Examiner* — Douglas J McGinty
(74) *Attorney, Agent, or Firm* — Oblon, McClelland, Maier & Neustadt, L.L.P.

(57) ABSTRACT

There is provided a solvent composition which is a stable solvent composition which is excellent in solubility of various organic substances, has a sufficient drying property, and has no adverse effect on a global environment, is stabilized not to decompose, and moreover suppresses metal corrosion under coexistence with metal, and which can be used without having an adverse effect on articles of various materials such as metal, plastic, and elastomer in a wide range of industrial uses such as cleaning and dilution coating uses. A solvent composition including: a solvent (A) including (D-1-chloro-3,3,3-trifluoro-1-propene; and a stabilizer (B) consisting of HCFC whose boiling point at normal pressure is not lower than 30° C. nor higher than 60° C.

9 Claims, 1 Drawing Sheet

(56) References Cited

FOREIGN PATENT DOCUMENTS

| | | |
|---|---|---|
| JP | 2012-020992 | 2/2012 |
| JP | 2012-509324 | 4/2012 |
| JP | 2014-507486 | 3/2014 |
| JP | 2014-181405 | 9/2014 |
| JP | 2015-505302 | 2/2015 |
| KR | 10-2009-0104771 | 10/2009 |
| KR | 10-2013-0136497 | 12/2013 |
| MX | 2009003206 | 9/2009 |
| MX | 2013006029 | 7/2013 |
| MX | 2014002830 | 12/2014 |
| WO | WO 2011/007723 A1 | 1/2011 |
| WO | WO 2012/075283 A2 | 6/2012 |
| WO | WO 2014/175403 A1 | 10/2014 |
| WO | WO 2015/060261 A1 | 4/2015 |
| WO | WO 2015/092211 A1 | 6/2015 |
| WO | WO-2015092211 A1 * | 6/2015 ............. C01B 7/191 |

* cited by examiner

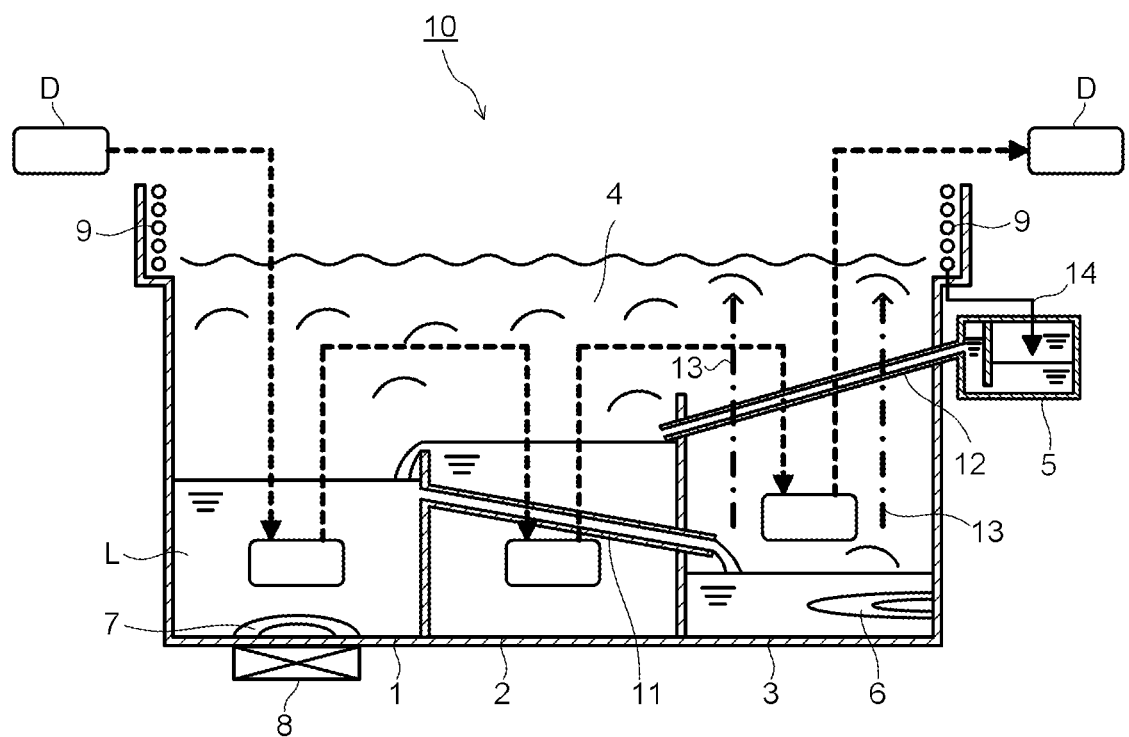

SOLVENT COMPOSITION, CLEANING METHOD AND METHOD OF FORMING A COATING FILM

CROSS-REFERENCE TO RELATED APPLICATIONS

[0001] This application is a continuation of U.S. Appln. No. 15/911,298, filed Mar. 5, 2018, which is a continuation of prior International Application No. PCT/W2016/075641, filed on Sep. 1, 2016 which is based upon and claims the benefit of priority from Japanese Patent Application No. 2015-174528, filed on Sep. 4, 2015; the entire contents of all of which are incorporated herein by reference.

FIELD

The present invention relates to a solvent composition, a cleaning method by using the solvent composition, and a method of, forming a coating film consisting of a nonvolatile organic compound by using the solvent composition as a dilution coating solvent.

BACKGROUND

In manufacture of IC, an electronic component, a precision machinery component, an optical component, and the like, in a manufacturing process, an assembly process, a final finishing process, and the like, the components are cleaned by a cleaning solvent composition, thereby removing flux, a processing oil, wax, a release agent, dust, and the like adhering to the components. Further, as a method of manufacturing an article having a coating film containing various nonvolatile organic compounds such as a lubricant, for example, there is known a method in which a solution in which the nonvolatile organic compounds have been dissolved in a diluting solvent is prepared, the solution is applied on a surface of an article to be coated, and thereafter the diluting solvent is evaporated to form a coating film. The diluting solvent is required to allow the nonvolatile organic compounds to be dissolved sufficiently and further to have a sufficient drying property as well.

As a solvent to be used in such uses, in terms of incombustibility and low toxicity, excellent stability, no encroachment on a base material of metal, plastic, elastomer, or the like, and excellent chemical and thermal stability, there has been used a fluorinated solvent or the like containing a chlorofluorocarbon (hereinafter referred to as "CFC") such as 1,1,2-trichloro-1,2,2-trifluoroethane, a hydrochlorofluorocarbon (hereinafter referred to as "HCFC") such as 2,2-dichloro-1,1,1-trifluoroethane, 1,1-dichloro-1-fluoroethane, 1,1-dichloro-2,2,3,3,3-pentafluoropropane, 1,3-dichloro-1,1,2,2,3-pentafluoropropane, or the like.

However, because CFCs and HCFCs are chemically very stable, they each have a long lifetime in the troposphere after vaporization, and diffuse and reach the stratosphere. Therefore, there is a problem that CFCs and HCFCs which have reached the stratosphere are decomposed by ultraviolet rays and generates chlorine radicals to deplete an ozone layer.

On the other hand, as a solvent having no chlorine atom and having no adverse effect on the ozone layer, a perfluorocarbon (hereinafter referred to as "PFC") is known. In addition, as an alternative solvent to CFCs and HCFCs, a hydrofluorocarbon (hereinafter referred to as "HFC"), a hydrofluoroether (hereinafter referred to as "HFE"), and the like are also under development. However, there is a problem that HFCs and PFCs have a high global warming potential.

As a new solvent which has no adverse effect on a global environment such as having no adverse effect on the ozone layer and a small global warming potential, and while having characteristics of CFCs, HCFCs, HFCs, HFEs, and PFCs which are incombustible and low in toxicity, (Z)-1-chloro-3,3,3-trifluoro-1-propene ($CF_3CH=CClH$, HCFO-1233zd(Z), hereinafter also referred to as "1233zd(Z)") is proposed.

In Patent Reference 1 (JP-A No. 2014-181405), a cleaning agent including 1233zd(Z) is disclosed. 1233zd(Z) has excellent properties of having a short lifetime in the atmosphere due to easy decomposition, having low ozone depletion potential and global warming potential, and having a small effect on a global environment.

However, 1233zd(Z) is of inferior stability due to the easy decomposition. Therefore, there has been a problem that when 1233zd(Z) is used as the cleaning solvent or the dilution coating solvent, the decomposition of 1233zd(Z) in use acidifies the solvent or an acid produced by the decomposition of 1233zd(Z), or the like corrodes a metal in contact with the solvent, for example, a metal used as materials for a storage container, a pipe, a device, and the like. Further, in some cases, vapor caused by volatilizing a solvent after use is collected, this vapor is aggregated by cooling, and the solvent is repeatedly reused, but in particular, a decrease in stability in the repeated use has been a large problem.

SUMMARY

In the present invention, it is an object thereof to provide a solvent composition which is a solvent composition including 1233zd(Z) being excellent in solubility of various organic substances and having a sufficient drying property and no adverse effect on a global environment, is storable in a state in which the solvent is stabilized to suppress decomposition, and suppresses corrosion of a metal in contact therewith.

In the present invention, it is an object thereof to provide a cleaning method of an article to be cleaned, in which the corrosion of metal is suppressed without having an adverse effect on the global environment and which is stable and efficient.

In the present invention, in a method of forming a coating film consisting of a nonvolatile organic compound, it is an object thereof to provide a method in which the corrosion of metal is suppressed without having an adverse effect on the global environment and a method in which a homogeneous coating film can be stably and simply formed.

In the present invention, a solvent composition having the following configuration, a cleaning method, and a method of forming a coating film are provided. Note that in this description, unless otherwise stated, a saturated hydrochlorofluorocarbon is referred to as HCFC and used as distinguished from HCFO. Further, HCFC is sometimes specified as is the saturated hydrochlorofluorocarbon. Further, in this description, regarding a halogenated hydrocarbon, an abbreviated name of the compound is described in parentheses behind a compound name, and the abbreviated name is used instead of the compound name as necessary. In addition, (E) indicates an E-isomer (trans isomer) and (Z) indicates a Z-isomer (cis isomer), which are denoted for the abbreviated names of compounds having geometric isomers. When there is no description of the E-isomer or the Z-isomer in the name or the abbreviated name of the compound, the name or the abbreviated name means a generic name including the E-isomer, the Z-isomer, and a mixture of the E-isomer and the Z-isomer.

[1] A solvent composition including: a solvent including (Z)-1-chloro-3,3,3-trifluoro-1-propene (1233zd(Z)); and a stabilizer consisting of a saturated hydrochlorofluorocarbon (HCFC) whose boiling point at normal pressure is not lower than 30° C. nor higher than 60° C.

[2] The solvent composition according to [1], wherein a proportion, of a content of the stabilizer to a content of the solvent is 1 mass ppm to 1 mass %.

[3] The solvent composition according to [1], wherein a proportion of the content of the stabilizer to a content of 1233zd(Z) is 1 mass ppm to 1 mass %.

[4] The solvent composition according to [1], wherein a proportion of the content of 1233zd(Z) to a total amount of the solvent is 80 to 100 mass %. [5] The solvent composition according to [1], wherein the saturated HCFC whose boiling point at normal pressure is not lower than 30° C. nor higher than 60° C. is one or more selected from a group consisting of 2-chloro-3,3,3-trifluoropropane ($CF_3$—CHCl—$CH_3$, HCFC-253db, hereinafter also referred to as "253db"), 1-chloro-3,3,3-trifluoropropane ($CF_3$—$CH_2$—$CH_2$Cl, HCFC-253fb, hereinafter also referred to as "253fb"). 1,1-dichloro-2,2,3,3,3-pentafluoropropane ($CF_3$—$CF_2$—$CHCl_2$, HCFC-225ca, hereinafter also referred to as "225ca"), and 1,3-dichloro-1,1,2,2,3-pentafluoropropane ($CClF_2$—$CF_2$—CClFH, HCFC-225cb, hereinafter also referred to as "225cb").

[6] A cleaning method including bringing the solvent composition according to [1] and an article to be cleaned into contact with each other.

[7] The cleaning method according to [6], wherein a processing oil adhering to the article to be cleaned is cleaned.

[8] The cleaning method according to [7], wherein the processing oil is one or more selected from a group consisting of a cutting oil, a quenching oil, a rolling oil, a lubricating oil, a machine oil, a presswork oil, a stamping oil, a drawing oil, an assembly oil, and a wire drawing oil.

[9] The cleaning method according to [6], wherein the article to be cleaned is clothing.

[10] A method of forming a coating film including dissolving a nonvolatile organic compound in the solvent composition according to [1] to prepare a coating film-forming composition and evaporating the solvent composition after applying the coating film-forming composition on an article to be coated, to form a coating film consisting of the nonvolatile organic compound.

According to the present invention, it is possible to provide a solvent composition which is a solvent composition containing a solvent being excellent in solubility of various organic substances, having a sufficient drying property, and having no adverse effect on a global environment, and is storable in a state in which the solvent is stabilized to suppress decomposition and suppresses corrosion of a metal in contact therewith.

A cleaning method of the present invention allows cleaning of an article to be cleaned, in which the corrosion of metal is suppressed without having an adverse effect on the global environment and which is stable and efficient.

A method of forming a coating film consisting of a nonvolatile organic compound of the present invention is a method in which the corrosion of metal is suppressed without having an adverse effect on the global environment, and according to the method of forming, a homogeneous coating film of the nonvolatile organic compound can be stably and simply formed.

BRIEF DESCRIPTION OF THE DRAWINGS

FIG. 1 is a view schematically illustrating a structure of a cleaning apparatus in which a solvent composition of this embodiment is used.

MODE FOR CARRYING OUT THE INVENTION

[Solvent Composition]
A solvent composition of the present invention contains the following solvent (A) and stabilizer (B).

A solvent (A) is a solvent including 1233zd(Z).

A stabilizer (B) is a stabilizer consisting of HCFC whose boiling point at normal pressure is 30 to 60° C.

Note that in this description, "normal pressure" is 760 mmHg. Further, unless otherwise stated, "boiling point" in this description is a boiling point at normal pressure.

1233zd (Z) to be used for the solvent composition of the present invention is one kind of HCFO having a double bond between carbon atom-carbon atom, its lifetime in the atmosphere is short, and its ozone depletion potential and global warming potential are low. Further, 1233zd(Z) has a boiling point of about 40° C. (normal pressure) and is excellent in a drying property. Further, even though it is boiled to turn into vapor, the vapor temperature is about 40° C. and therefore it is difficult to have an adverse effect even on parts susceptible to heat such as resin parts. In addition, 1233zd (Z) has excellent ability such as no flash point, low surface tension and viscosity, and easy evaporation even at room temperature.

On the other hand, 1233zd(Z) does not have sufficient stability and gradually decomposes to be acidified even though it is stored at room temperature. The present invention has been made by finding that by combining the stabilizer (B) consisting of HCFC whose boiling point at normal pressure is 30 to 60° C. with the solvent (A) including 1233zd(Z), the decomposition of 1233zd(Z) is suppressed and 1233zd(Z) can be used stably for long periods.

Hereinafter, the solvent (A) and the stabilizer (B) contained in a solvent composition of the present invention will be explained.

<Solvent (A) Including 1233zd(Z)>

The solvent composition of the present invention contains the solvent (A) containing 1233zd(Z). The solvent (A) may be consisting of only 1233zd(Z) or may contain a solvent (hereinafter referred to as "solvent (a1)") other than 1233zd (Z) according to the purpose of enhancing solubility of various substances to become solutes, regulating an evaporation rate, or the like in a range in which the above-described characteristics which 1233zd(Z) has is not impaired.

The solvent (a1) is not particularly limited as long as it is a solvent soluble in 1233zd(Z). Note that the solvent soluble in 1233zd(Z) means a solvent which uniformly dissolves in 1233zd(Z) without causing phase separation or turbidity by stirring at normal temperature (25° C.) when 1233zd(Z) and the solvent are mixed at an optional mixing ratio. Further, the solvent means a substance in liquid state at normal temperature (25° C.). However, the stabilizer (B) in the present invention is excepted from the solvent (a1).

The content proportion of the solvent (A) in the solvent composition of the present invention is preferably 80 mass % or more and more preferably 90 mass % or more to the total amount of the solvent composition. The content proportion of the solvent (A) in the solvent composition is preferably as high as possible. Accordingly, an upper limit value of the content proportion of the solvent (A) in the solvent composition is particularly preferably a value obtained by subtracting a lower limit value of the content proportion of the stabilizer (B) to be used.

A proportion of the content of 1233zd(Z) to the total amount of the solvent (A), namely a proportion of the content of 1233zd(Z) to the total amount of 100 mass % of 1233zd(Z) and the solvent (a1) is preferably 50 mass % or more, more preferably 80 mass % or more, further preferably 90 mass % or more, and the most preferably 100 mass %. As long as the proportion of the content of 1233zd(Z) to the total amount of the solvent (A) is equal to or more than the above lower limit value, the excellent drying property which 1233zd(Z) has is not inhibited. An upper limit value of the content proportion of 1233zd(Z) is 100 mass %.

1233zd(Z) can be manufactured by, for example, a method in which a reaction product obtained by a method mentioned in paragraphs [0011] to [0012] in JP-A No. 2012-509324, a method mentioned in JP-A No. 2015-505302, or a method mentioned in WO No. 2014/175403 is purified by distillation, or the like.

Specifically, the reaction product including 1233zd(Z) is obtained by a method of subjecting 1,1,3,3-tetrachloropropene (HCO-1230za) and/or 1,1,1,3,3-pentachloropropane (HCC-240fa) to vapor phase fluorination in the presence or in the absence of a catalyst, a method of subjecting HCO-1230za to liquid phase fluorination, a method of treating 1,1,2-trichloro-3,3,3-trifluoropropane (HCFC-233da) by using a dechlorinating agent, a method of subjecting a compound in which 1,1-dichloro-1,3,3-trifluoropropane (HCFC-2431b, hereinafter also referred to as "2431b") is 5 mol % or less with respect to the total amount of 1,1-dichloro-3,3,3-trifluoropropane (HCFC-243fa, hereinafter also referred to as "243fa") and 2431fb to a dehydrochlorination reaction, or the like. It is possible to manufacture 1233zd(Z) by purifying the obtained reaction product including 1233zd(Z) by distillation.

When the solvent (A) contains the solvent (a1), a proportion of the content of the solvent (a1) to the total amount of the solvent (A), namely a proportion of the content of the solvent (a1) to the total amount of 100 mass % of 1233zd(Z) and the solvent (a1) is preferably 0.1 to 50 mass %, more preferably 0.5 to 20 mass %, and further preferably 1 to 10 mass %.

As long as the proportion of the content of the solvent (a1) to the total amount of the solvent (A) is equal to or more than the above-described lower limit value, an effect due to the solvent (a1) can be sufficiently obtained. As long as the proportion of the content of the solvent (a1) to the total amount of the solvent (A) is equal to or less than the above-described upper limit value, the solvent composition is excellent in the drying property.

Further, when 1233zd(Z) and the solvent (a1) form azeotropic composition, use in the azeotropic composition is also possible.

As the solvent (a1), at least one selected from a group consisting of a hydrocarbon, alcohol, ketone, an ester a chlorocarbon, HFC, and HFE is preferable.

As the hydrocarbon, a hydrocarbon having 5 or more carbon atoms is preferable. With the hydrocarbon having 5 or more carbon atoms used, a chain structure hydrocarbon or a cyclic structure hydrocarbon is applicable, and further a saturated hydrocarbon or an unsaturated hydrocarbon is applicable.

The hydrocarbon is preferred to be n-pentane, methylbutane, n-hexane, 2-methylpentane, 2,2-dimethylbutane, 2,3-dimethylbutane, n-heptane, 2-methylhexane, 3-methylhexane, 2,4-dimethylpentane, n-octane, 2-methylheptane, 3-methylheptane, 4-methylheptane, 2,2-dimethylhexane, 2,5-dimethylhexane, 3,3-dimethylhexane, 2-methyl-3-ethylpentane, 3-methyl-3-ethylpentane, 2,3,3-trimethylpentane, 2,3,4-trimethylpentane. 2,2,3-trimethylpentane, 2-methylheptane, 2,2,4-trimethylpentane, n-nonane, 2,2,5-trimethylhexane, n-decane, n-dodecane, 2-methyl-2-butene, 1-pentene, 2-pentene, 1-hexene, 1-octene, 1-nonene, 1-decene, cyclopentane, methylcyclopentane, cyclohexane, methylcyclohexane, ethylcyclohexane, bicyclohexane, cyclohexene, α-pinene, dipentene, decalin, tetralin, or amyl naphthalene, and n-pentane, cyclopentane, n-hexane, cyclohexane, or n-heptane is particularly preferable.

As the alcohol, an alcohol having 1 to 16 carbon atoms is preferable. With the alcohol having 1 to 16 carbon atoms used, a chain structure alcohol or a cyclic structure alcohol is applicable, and further a saturated alcohol or an unsaturated alcohol is applicable.

The alcohol is preferred to be methanol, ethanol, n-propyl alcohol, isopropyl alcohol, n-butyl alcohol, sec-butyl alcohol, isobutyl alcohol, tert-butyl alcohol, 1-pentanol, 2-pentanol, 1-ethyl-1-propanol, 2-methyl-1-butanol, 3-methyl-1-butanol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, 1-decanol, 1-undecanol, 1-dodecanol, allyl alcohol, propargyl alcohol, benzyl alcohol, cyclohexanol, 1-methylcyclohexanol, 2-methylcyclohexanol, 3-methylcyclohexanol, 4-methylcyclohexanol, α-terpineol, 2,6-dimethyl-4-heptanol, nonyl alcohol, or tetradecyl alcohol, and methanol, ethanol, or isopropyl alcohol is particularly preferable.

As the ketone, ketone having 3 to 9 carbon atoms is preferable. With the ketone having a number of 3 to 9 carbon atoms used, a chain structure ketone or a cyclic structure ketone is applicable, and further saturated ketone or unsaturated ketone is applicable.

The ketone is preferred to be acetone, methyl ethyl ketone, 2-pentanone, 3-pentanone, 2-hexanone, methyl isobutyl ketone, 2-heptanone, 3-heptanone, 4-heptanone, diisobutyl ketone, mesityl oxide, phorone, 2-octanone, cyclohexanone, methylcyclohexanone, isophorone, 2,4-pentanedione, 2,5-hexanedione, diacetone alcohol, or acetophenone, and acetone or methyl ethyl ketone is particularly preferable.

As the ester, an ester having 2 to 19 carbon atoms is preferable. With the ester having 2 to 19 carbon atoms used, a chain structure ester or a cyclic structure ester is applicable, and further a saturated ester or an unsaturated ester is applicable.

The ester is preferred to be methyl formate, ethyl formate, propyl formate, butyl formate, isobutyl formate, pentyl formate, methyl acetate, ethyl acetate, propyl acetate, isopropyl acetate, butyl acetate, isobutyl acetate, sec-butyl acetate, pentyl acetate, methoxybutyl acetate, sec-hexyl acetate, 2-ethylbutyl acetate, 2-ethylhexyl acetate, cyclohexyl acetate, benzyl acetate, methyl propionate, ethyl propionate, butyl propionate, methyl butyrate, ethyl butyrate, butyl butyrate, isobutyl isobutyrate, 2-hydroxy-2-methyl-propionic acid ethyl ester, methyl benzoate, ethyl benzoate, propyl benzoate, butyl benzoate, benzyl benzoate, γ-butyrolactone, diethyl oxalate, dibutyl oxalate, dipentyl oxalate, diethyl malonate, dimethyl maleate, diethyl maleate, dibutyl maleate, dibutyl tartrate, tributyl citrate, dibutyl sebacate, dimethyl phthalate, diethyl phthalate, dibutyl phthalate, or the like, and methyl acetate or ethyl acetate is particularly preferable.

As the chlorocarbon, a chlorocarbon having 1 to 3 carbon atoms is preferable. With the chlorocarbon having 1 to 3 carbon atoms used, a chain structure chlorocarbon or a cyclic structure chlorocarbon is applicable, and further a saturated chlorocarbon or an unsaturated chlorocarbon is applicable.

The chlorocarbon is preferred to be methylene chloride, 1,1-dichloroethane, 1,2-dichloroethane, 1,1,2-trichloroethane, 1,1,1,2-tetrachloroethane, 1,1,2,2-tetrachloroethane, pentachloroethane, 1,1-dichloroethylene, (Z)-1,2-dichloroethylene, (E)-1,2-dichloroethylene, trichloroethylene, tetrachloroethylene, or the like, and methylene chloride, (E)-1,2-dichloroethylene, or trichloroethylene is particularly preferable.

As HFC, a chain structure or cyclic structure HFC having 4 to 8 carbon atoms is preferable, and HFC in which the number of fluorine atoms in one molecule is equal to or more than the number of hydrogen atoms therein is more preferable.

HFC is preferred to be 1,1,1,3,3-pentafluorobutane, 1,1,1,2,2,3,4,5,5,5-decafluoropentane, 1,1,2,2,3,3,4-heptafluorocyclopentane, 1,1,1,2,2,3,3,4,4-nonafluorohexane, 1,1,1,2,2,3,3,4,4,5,5,6,6-tridecafluorohexane, or 1,1,1,2,2,3,3,4,4,5,5,6,6-tridecafluorooctane, and 1,1,1,2,2,3,4,5,5,5-decafluoropentane, 1,1,1,2,2,3,3,4,4-nomfluorohexane, or 1,1,1,2,2,3,3,4,4,5,5,6,6-tridecafluorohexane is particularly preferable.

HFE is preferred to be (perfluorobutoxy)methane, (perfluorobutoxy)ethane, or 1,1,2,2-tetrafluoro-1-(2,2,2-trifluoroethoxy)ethane, and (perfluorobutoxy)methane or 1,1,2,2-tetrafluoro-1-(2,2,2-trifluoroethoxy)ethane is particularly preferable.

The solvent (a1) included in the solvent composition of the present invention may be one or may be two or more.

The solvent (a1) is preferably a solvent having no flash point. As the solvent (a1) having no flash point, HFC such as 1,1,1,2,2,3,4,5,5,5-decafluoropentane, 1,1,1,2,2,3,3,4,4-nonafluorohexane, or 1,1,1,2,2,3,3,4,4,5,5,6,6-tridecafluorohexane, or HFE such as (perfluorobutoxy)methane or 1,1,2,2-tetrafluoro-1-(2,2,2-trifluoroethoxy)ethane can be cited. When a solvent having a flash point is used as the solvent (a1), it is preferably mixed with 1233zd(Z) are used in a range of having no flash point in being used as the solvent composition of the present invention.

Note that in the solvent composition of the present invention, as the solvent (a1), (E)-1-chloro-3,3,3-trifluoro-1-propene (HCFO-1233zd(E), hereinafter also referred to as "1233zd(E)") which is a geometric isomer of 1233zd(Z) may be contained in the content proportion of 0.1 mass % or less to the total amount of the solvent (A). 1233zd(E) is a by-product to be produced with 1233zd(Z) in manufacturing the above-described 1233zd(Z). High purification is required to remove 1233zd(E) from a reaction product including 1233zd(Z) and 1233zd(E). Accordingly, when the solvent composition of the present invention contains 1233zd(E) in the above-described proportion, the high purification of 1233zd(Z) can be omitted to lead to improvement in productivity.

<Stabilizer (B)>

As the stabilizer (B), the solvent composition of the present invention includes the stabilizer consisting of HCFC whose boiling point at normal pressure is 30 to 60° C. The stabilizer in the present invention means a compound having an ability to suppress decomposition of 1233zd(Z) by oxygen.

Here, the ability of a certain compound to suppress the decomposition of 1233zd(Z) by oxygen can be evaluated by measuring an acid produced by the decomposition of 1233zd(Z) by oxygen. For example, it is possible to evaluate a difference between an initial pH value in a test solution in which a sample has been dissolved in 1233zd(Z) in a predetermined proportion and a pH value after storing the test solution for a certain period as an index.

Note that a pH of the solvent composition in the present invention means a pH of a water layer being an upper layer when the solvent composition and pH 7 pure water are mixed, shaken for predetermined time, and thereafter left still to be separated into two layers. As a specific measurement condition of pH, a condition mentioned in a term of pH measurement mentioned in the later-described Examples can be employed.

A proportion of the content of the stabilizer (B) to the content of the solvent (A) is preferably 1 mass ppm to 1 mass % from the viewpoint of an effect of the stabilizer, exhibiting an ability of 1233zd(Z) sufficiently, and suppressing an effect on an ozone laver. It is more preferably 3 mass ppm or more and further preferably 5 mass ppm or more from the viewpoint of the effect of the stabilizer. Further, it is preferably 0.5 mass % or less and more preferably 0.1 mass % or less from the viewpoint of exhibiting the ability of 1233zd(Z) sufficiently and the viewpoint of suppressing the effect on the ozone layer.

A proportion of the content of the stabilizer (B) to the content of 1233zd(Z) is preferably 1 mass ppm to 1 mass %, more preferably 3 mass ppm to 0.5 mass %, and the most preferably 5 mass ppm to 0.1 mass % from the viewpoint of the effect of the stabilizer, exhibiting the ability of 1233zd(Z) sufficiently, and suppressing the effect on the ozone layer.

The proportion of the content of the stabilizer (B) to the content of 1233zd(Z) is more preferably 3 mass ppm or more and further preferably 5 mass ppm or more from the viewpoint of the effect of the stabilizer. Further, it is more preferably 0.5 mass % or less and further preferably 0.1 mass % or less from the viewpoint of exhibiting the ability of 1233zd(Z) sufficiently and suppressing the effect on the ozone layer.

The stabilizer (B) to be used in the present invention is consisting of HCFC whose boiling point at normal pressure is 30 to 60° C. As the stabilizer (B), one kind of compound may be used alone or two or more kinds of compounds may be used in combination. Note that when the stabilizer (B) is consisting of the two or more kinds of compounds, the proportion of the content of the above stabilizer (B) means a proportion of the total content of the two or more kinds of compounds.

(HCFC Whose Boiling Point at Normal Pressure is 30 to 60° C.)

HCFC is a saturated compound having at least one or more each of a chlorine atom, a fluorine atom, a hydrogen atom, and a carbon atom in a molecule, and can be represented by the following general formula (1).

$$C_w H_x Cl_y F_z \qquad (1)$$

In the general formula (1), any of x, y, z, and w is an integer, and they are numbers satisfying $w \geq 1$, $x \geq 1$, $y \geq 1$, $z \geq 1$, and $x+y+z=2w+2$.

HCFC to be used as the stabilizer (B) is the one whose boiling point at normal pressure is 30 to 60° C. and preferably 35 to 55° C. among the compounds represented by the general formula (1).

HCFC whose boiling point is in the above-described range is preferred to be 1-chloro-2-fluoroethane (HCFC-151), 1-chloro-1,2-difluoroethane (HCFC-142a). 1,2-dichloro-1-fluoroethane (HCFC-141), 1,1-dichloro-1-fluoroethane (HCFC-141b), 1,2-dichloro-1,1-difluoroethane (HCFC-132b), 1-chloro-1,3,3,3-tetrafluoropropane (HCFC-244fa), 2-chloro-1,1,1,3,3-pentafluoropropane (HCFC-235da), 253fb, 225ca, or 225cb from the viewpoint of the effect of the stabilizer, exhibiting the ability of 1233zd(Z) sufficiently, and suppressing the effect on the ozone layer. 253db (boiling point: 30.1° C.), 253fb (boiling point: 45.1° C.), 225ca (boiling point: 51.1° C.), or 225cb (boiling point: 56.1° C.) is particularly preferable.

Furthermore, the solvent composition of the present invention may contain other stabilizers which a solvent composition contains normally, or the like other than the solvent (A) and the stabilizer (B) in a range in which an effect of the present invention is not impaired.

The solvent composition of the present invention can be produced by weighing and mixing each component of the above-described solvent (A), stabilizer (B), other optionally added stabilizers, and the like.

The solvent composition of the present invention as described above is a stable solvent composition which is excellent in solubility of various organic substances, has a sufficient drying property, and has a short lifetime in the atmosphere, has no adverse effect on a global environment, is stabilized not to cause decomposition, and suppresses corrosion of a metal in contact therewith.

The solvent composition of the present invention can be used as a solvent composition for cleaning, coating film formation, and dry cleaning, which has no adverse effect on articles to be cleaned or coated in a wide range of materials such as metal, plastic, elastomer, glass, ceramics, and fabric.

[Cleaning Method]

A cleaning method of the present invention is a method of cleaning extraneous matter adhering to an article to be cleaned by using the above-described solvent composition of the present invention, and is characterized by bringing the solvent composition of the present invention and the article to be cleaned into contact with each other.

The cleaning method of the article to be cleaned by using the solvent composition of the present invention is not particularly limited except to bring the solvent composition of the present invention and the article to be cleaned into contact with each other. For example, it is sufficient to employ manual cleaning, immersion cleaning, spray cleaning, immersion-oscillation cleaning, immersion ultrasonic cleaning, vapor cleaning, methods by combining these, and the like. Cleaning conditions such as a time of the above contact, the number of times of the above contact, and a temperature of the solvent composition of the present invention at a time of cleaning, or a cleaning apparatus can be appropriately selected.

As the articles to be cleaned in the cleaning method of the present invention, there can be cited workpieces or the like of metal, ceramics, glass, plastic, elastomer, and so on in a precision machinery industry, a metal processing industry, an optical instrument industry, an electronic industry, a plastics industry, and so on, for example. Specifically, there can be cited automotive parts such as a bumper, a gear, transmission parts, and radiator parts; electronic and electrical components such as a printed-circuit board, IC components, a lead frame, motor components, and a capacitor; precision machinery components such as a bearing, a gear, a gear made of engineering plastic, watch parts, camera components, and an optical lens; heavy machinery parts such as a printing machine, a printing machine blade, a print roll, rolled products, a construction machine, a glass substrate, and heavy equipment parts; housewares such as tableware; fiber products, and so on.

In the cleaning method of the present invention, as the extraneous matter to be removed by cleaning, there can be cited a flux; a processing oil such as a cutting oil, a quenching oil, a rolling oil, a lubricating oil, a machine oil, a presswork oil, a stamping oil, a drawing oil, an assembly oil, and a wire drawing oil; a release agent; dust, and the like adhering to the above-described various articles to be cleaned. Because this solvent composition is more excellent in solubility of the processing oil compared with HFC and HFE which are conventional solvent compositions, and the like, it is preferably used for cleaning of the processing oil.

Further, the solvent composition of the present invention is applicable to cleaning of the articles to be cleaned of various materials such as metal, plastic, elastomer, glass, ceramics, and composite materials of the above.

Furthermore, the solvent composition of the present invention can be used for cleaning for removing dirt from various pieces of clothing formed of fabrics made of natural fiber and made of synthetic fiber.

Next, one example of a cleaning apparatus to be used for the cleaning method of the present invention will be explained. FIG. 1 is a view schematically illustrating a structure of a cleaning apparatus 10 usable for the cleaning method of the present invention.

The cleaning apparatus 10 illustrated in FIG. 1 is a three-tank ultrasonic cleaning apparatus mainly for cleaning electronic and electrical components, precision machinery components, optical instrument components, and the like. The cleaning apparatus 10 includes a cleaning tank 1, a rinse tank 2, and a vapor generation tank 3 in each of which a solvent composition L is put in, a vapor zone 4 which is filled with vapor of the solvent composition L, cooling tubes 9 which cool the evaporated solvent composition L, and a water separation tank 5 for subjecting the solvent composition L condensed by the cooling tubes 9 and water adhering to the cooling tubes to a stationary separation as a main structure. In actual cleaning, an article D to be cleaned is put in a dedicated jig or basket, or the like, and the cleaning is completed while moving the article D to be cleaned in order of the cleaning tank 1, the rinse tank 2, and the vapor zone 4 immediately above the vapor generation tank 3 in the cleaning apparatus 10.

A heater 7 and an ultrasonic vibrator 8 are included in a lower portion of the cleaning tank 1. In the cleaning tank 1, a temperature of the solvent composition L of the present invention is increased by heating with the heater 7, physical force is imparted to the article D to be cleaned by cavitation generated by the ultrasonic vibrator 8 while being controlled at a constant temperature, and dirt adhering to the article D to be cleaned is removed by cleaning. As the physical force at this time, other than an ultrasonic wave, any method which has been employed for previous cleaning machines, such as oscillation or a submerged jet of the solvent composition L, may be used. Note that in the cleaning of the article D to be cleaned in the cleaning tank 1, the ultrasonic vibration is not essential, and the cleaning may be performed without the ultrasonic vibration as necessary. When the article D to be cleaned is moved from the cleaning tank 1 to the rinse tank 2 in the cleaning apparatus 10, components of the solvent composition L adhere to a surface to be cleaned. Therefore, it becomes possible to move the article D to be cleaned to the rinse tank 2 while preventing dirt components from sticking to the surface of the article D to be cleaned due to drying.

In the rinse tank 2, the dirt components dissolving in the solvent composition L adhering to the article D to be cleaned when the article D to be cleaned is pulled up from the cleaning tank 1, are removed by immersing the article D to be cleaned in the solvent composition L. The rinse tank 2 may have the devices which impart physical force to the article D to be cleaned similarly to the cleaning tank 1. The cleaning apparatus 10 has a design in which an overflow of the solvent composition L housed in the rinse tank 2 flows into the cleaning tank 1. Further, the cleaning tank 1 includes a pipe 11 which feeds the solvent composition L to the vapor generation tank 3 in order to prevent a solution level from becoming equal to or more than a predetermined height.

In a lower portion of the vapor generation tank 3, a heater 6 which heats the solvent composition L in the vapor generation tank 3 is included. The solvent composition L fed into the vapor generation tank 3 is boiled by heating with the heater 6, part or the whole of its composition becomes vapor to rise in a direction illustrated by arrows 13, namely in an upper direction of the vapor generation tank 3, and the vapor zone 4 filled with the vapor of the solvent composition L is formed immediately above the vapor generation tank 3. The article D to be cleaned for which the cleaning in the rinse tank 2 has been completed is transported to the vapor zone 4 immediately above the vapor generation tank 3 and cleaned by the vapor through an exposure to the vapor of the solvent composition L. In the vapor cleaning, the components obtained by aggregating and liquefying the vapor of the solvent composition L on the surface of the article D to be cleaned clean the article D to be cleaned. Because the vapor of the solvent composition L to be used for the vapor cleaning includes no dirt component, it is effective as a finish cleaning in the last step of the cleaning.

Note that in the cleaning apparatus 10, an upper space of the tanks is used in common as the vapor zone 4. The vapor generated from the cleaning tank 1, the rinse tank 2, and the vapor generation tank 3 is recovered from the vapor zone 4 as the solvent composition L by being cooled and condensed by the cooling tubes 9 provided in an upper portion of a wall surface of the cleaning apparatus 10. Thereafter, the aggregated solvent composition L is housed in the water separation tank 5 via a pipe 14 connecting the cooling tubes 9 and the water separation tank 5. In the water separation tank 5, water mixing in the solvent composition L is separated. The solvent composition L from which the water has been separated is returned to the rinse tank 2 through a pipe 12 connecting the water separation tank 5 and the rinse tank 2. In the cleaning apparatus 10, such a mechanism allows a reduction in an evaporation loss of the solvent composition L.

Furthermore, in order to increase a cleaning effect, a cooling device is placed in the rinse tank 2, and this allows a temperature of the solvent composition L in the rinse tank 2 to be maintained at low temperatures and a temperature of the immersed article D to be cleaned to be kept low, and it is thereby effective to make a temperature difference between the vapor temperature and the temperature of the article D to be cleaned large and to increase an aggregated amount of the solvent composition L in the article D to be cleaned at the vapor cleaning.

Thus, in the cleaning apparatus 10, by circulating the solvent composition L housed in the tanks while changing its state into a liquid or a gas, the dirt components brought into the rinse tank 2 are accumulated continuously in the vapor generation tank 3, resulting in allowing maintenance of cleanliness of the rinse tank 2 and the vapor cleaning in the vapor zone 4.

[Dry Cleaning Solvent Composition]

Next, a case of using the solvent composition of the present invention for removal cleaning of dirt of various pieces of clothing will be explained.

The solvent composition of the present invention is suitable as a solvent for cleaning the clothing, namely, a dry cleaning solvent. There can be cited cleaning and removing of dirt adhering to clothing such as a shirt, a sweater, a jacket, a skirt, trousers, a windbreaker, gloves, a muffler, and a stole, as a dry cleaning application using the solvent composition of the present invention.

In particular, the solvent composition of the present invention is applicable to dry cleaning of the clothing made of fibers such as cotton, hemp, wool, rayon, polyester, acrylic, and nylon and the clothing on which parts such as metal parts, buttons, and fasteners or garnishes such as sequins are attached.

Moreover, when the solvent composition of the present invention is used as the dry cleaning solvent, in order to enhance the ability to remove water-soluble dirt such as sweat or mud, use as a dry cleaning solvent composition obtained by adding soap to the solvent composition of the present invention is possible. The soap indicates a surfactant to be used for the dry cleaning. As the soap, a cationic surfactant, a nonionic surfactant, an anionic surfactant, or an ampholytic surfactant is preferably used. One kind of surfactant may be used alone or two or more kinds of surfactants may be used in combination. Since 1233zd(Z) has a chlorine atom in its molecule, it has a wide range of solubility to various organic compounds. Therefore, it is not required to optimize the soap depending on the solvent as HFE and HFC are required, which allows use of various soaps.

As a specific example of the soaps, there can be cited a quaternary ammonium salt such as dodecyldimethylammonium chloride or trimethylammonium chloride as the cationic surfactant. There can be cited a surfactant such as polyoxyalkylene nonylphenyl ether, polyoxyalkylene alkyl ether, fatty acid alkanolamide, glycerin fatty acid ester, sorbitan fatty acid ester, sucrose fatty acid ester, propylene glycol fatty acid ester, or ester of phosphoric acid and fatty acid as the nonionic surfactant. There can be cited an alkyl sulfate such as a polyoxyethylene alkyl sulfate, a carboxylate such as a fatty acid salt (so-called soap), or a sulfonate such as an α-olefin sulfonate or a lauryl sulfate as the anionic surfactant. There can be cited a betaine compound such as alkylbetaine as the ampholytic surfactant.

A proportion of the content of the soap in the dry cleaning solvent composition is 0.01 to 10 mass %, preferably 0.1 to 5 mass %, and further preferably 0.2 to 2 mass % to the total amount of the solvent composition included in the dry cleaning solvent composition.

According to the above-explained cleaning method of the present invention, using the above-described solvent composition of the present invention suppresses decomposition of the solvent composition and allows repeated cleaning for a long period. In addition, as long as the solvent composition of the present invention is used, it is also possible to appropriately combine regeneration operations such as distillation regeneration and filtration regeneration, gas recovery in which scattered vapor of the solvent composition is recovered, and the like without problems.

[Method of Forming a Coating Film]

The solvent composition of the present invention can be used for a solvent (dilution coating solvent) for dilution coating of a nonvolatile organic compound. That is, a method of forming a coating film of the present invention is characterized by dissolving a nonvolatile organic compound in the above-described solvent composition of the present invention to prepare a coating film-forming composition and evaporating the solvent composition after applying the coating film-forming composition on an article to be coated, to form a coating film consisting of the nonvolatile organic compound.

Here, the nonvolatile organic compound in the present invention indicates the one which has a boiling point higher than that of the solvent composition of the present invention and in which the organic compound still remains on a surface even after evaporation of the solvent composition. As the nonvolatile organic compounds, specifically, there can be cited a lubricant, for example, perfluoropolyether, alkylbenzene, polyol ether, polyol ester, a mineral oil, a silicone oil, or the like, for imparting lubricity to an article, an antirust for imparting an anti-rust effect to metal parts, a moisture-proof coating agent for imparting water repellency to an article, an antifouling coating agent such as a finger-print removing/preventing agent for imparting antifouling ability to an article, and the like. In the method of forming the coating film of the present invention, it is preferable to use the lubricant as the nonvolatile organic compound from the viewpoint of solubility.

The method of forming the coating film of the present invention will be explained as follows by citing a case of forming a coating film of the lubricant on an article to be coated as an example.

When the solvent composition of the present invention is used as the dilution coating solvent for the lubricant, the lubricant is dissolved in the solvent composition of the present invention to be prepared as a lubricant composition being coating film-forming composition, the lubricant composition is applied on the article to be coated, and the solvent composition is evaporated to form a lubricant coating film on the above article to be coated.

The lubricant means the one which is used for reducing friction on a contact surface and preventing generation of heat and abrasion damage when two members move in a state in which their surfaces are brought into contact with each other. The lubricant may be any form of liquid (oil), semisolid (grease), and solid.

As the lubricant, in terms of excellent solubility to 1233zd (Z), a fluorine-based lubricant or a silicone-based lubricant is preferable. Note that the fluorine-based lubricant means a lubricant having a fluorine atom in a molecule. Further, the silicone-based lubricant means a lubricant including silicone.

The lubricant included in the above-described lubricant composition may be one or may be two or more. Each of the fluorine-based lubricant and the silicone-based lubricant may be used alone, or they may be used in combination.

A proportion of the content of the lubricant in the above-described lubricant composition (100 mass %) is preferably 0.01 to 50 mass %, more preferably 0.05 to 30 mass %, and further preferably 0.1 to 20 mass %. The remainder except the lubricant of the lubricant composition is the solvent composition. As long as the proportion of the content of the lubricant is in the above range, a film thickness of a applied film when the lubricant composition is applied on the article to be coated and a thickness of a lubricant coating film after drying are easily regulated in a proper range.

According to the method of forming the coating film of the present invention, in use for formation of the lubricant coating film, either in a state of the solvent composition of the present invention before dissolving the lubricant or in a state of the above-described lubricant composition, the solvent composition of the present invention and the lubricant composition do not decompose in storage or in use, and further it is possible to suppress occurrence of metal corrosion even under coexistence with metal. In the present invention, that allows coating film formation with high productivity without having an adverse effect on the global environment.

Similarly to a use for dilution coating solvent of this lubricant, by dissolving an antirust in the solvent composition in the present invention, applying on an article to be coated, and evaporating the solvent composition of the present invention, an antirust coating film can also be formed on the above article to be coated. The cases of forming coating films of other nonvolatile organic compounds such as the moisture-proof coating agent and the antifouling coating agent are also similar.

As the article to be coated, the articles to be coated made of various materials such as metal, plastic, elastomer, glass, and ceramics can be employed.

EXAMPLES

Hereinafter, the present invention will be explained in detail by examples. The present invention is not limited to these examples. Examples 1 to 35 are the examples of the solvent composition of the present invention, and Example 36 is a comparative example.

Examples 1 to 36

(Synthesis of 1233zd(Z))

A post-distillation tank bottom obtained by a method in Example 3 in WO No. 2014/175403 is further purified by distillation, thereby obtaining a composition including 1233zd(Z) (hereinafter referred to as "1233zd(Z) composition") with a purity of 99.9 mass %. That is, in the presence of tetra n-butyl ammonium chloride (TBAC), a reaction product is obtained by adding sodium hydroxide to a raw material composition which includes 243fa and 2431fb and in which 2431b is 5 mol % or less with respect to a total of 243fa and 2431fb, and a 1233zd(Z) composition is obtained by purifying the reaction product by distillation. A component of 0.1 mass % other than 1233zd(Z) in the 1233zd(Z) composition is (E)-1-chloro-3,3,3-trifluoro-1-propene (1233zd(E)).

(Synthesis of 253fb)

A crude liquid including 253fb is obtained by a method mentioned in Example 5 Step A and Step B in U.S. Publication 2015-0045590 and further purified by distillation, thereby obtaining 253fb with a purity of 100.0 mass %. That is, in the presence of a carbon (C) catalyst on which 2 mass % palladium (Pd) is supported, 3,3,3-trifluoropropene and hydrogen are made to react with each other to obtain 3,3,3-trifluoropropane. The crude liquid including 253fb is obtained by making the 3,3,3-trifluoropropane and chlorine react with each other under heating, and 253fb with a purity of 100.0 mass % is obtained by purifying the crude liquid by distillation.

(Synthesis of 253db)

253db with a purity of 100.0 mass % is obtained by a method mentioned in Journal of Organic Chemistry 1989, Vol 54, No 6, p 1433. That is, in the presence of triethylamine, 1,1,1-trifluoro-2-propanol diluted in dichloromethane and nonafluorobutane sulfonic acid fluoride are made to react with each other to obtain 1,1,1-trifluoroisopropyl nonaflate. A crude liquid including 253db is obtained by making the 1,1,1-trifluoroisopropyl nonaflate react with lithium chloride in acetylacetone, and 253db with a purity of 100.0 mass % is obtained by purifying the crude liquid by distillation.

(Preparation of 225Ca, 225cb)

225ca and 225cb each with a purity of 100.0% are obtained by purifying ASAHIKLIN AK-225 (brand name, mixture of 225ca and 225cb) manufactured by Asahi Glass Co., Ltd. by distillation.

(Preparation of 225ca/cb Mixture)

A 225ca/cb mixture consisting of 50.0 mass % of 225ca and 50.0 mass % of 225cb is obtained by mixing the above-described 225ca and 225cb which each have a purity of 100.0% in the same mass.

(Preparation of Solvent Composition)

Stabilizers (B) are added to the 1233zd(Z) compositions so as to become mass proportions illustrated in Table 1 when they are produced as solvent compositions, and 51 kg of each of the solvent compositions in Examples 1 to 35 is prepared. Further, 51 kg of the solvent composition in Example 36 illustrated in Table 1, which contains the HCFO-1233zd(Z) composition but does not contain the stabilizer (B), is prepared. Note that the mass proportions (mass ppm) of the stabilizers (B) illustrated in Table 1 are each a mass proportion of the content of the stabilizer (B) to the content of 1233zd(Z) in the solvent composition.

[Evaluation]

1. Stability Test and Metal Corrosion Resistance Test 100 g of each of the above-described solvent compositions in Examples 1 to 36 is put in a heat-resistant glass bottle in which a test piece of a general-purpose cold-rolled steel sheet (SPCC) has been put, and stored at a boiling point (40° C.) of HCFO-1233zd(Z) for seven days. Each pH immediately after the preparation and after the seven-day storage is measured, and further an appearance observation of a SPCC surface after the seven-day storage (after the test) is performed. Table 1 presents evaluation results.

(pH Measurement)

40 g of the solvent composition in each of the examples and 40 g of pure water prepared at pH 7 are put in a 200 mL-capacity separatory funnel and shaken for one minute. Thereafter, they are left still, and a water layer being an upper layer obtained by a two-layer separation is separately collected, and a pH of the water layer is measured by a pH meter (model number: HM-30R, manufactured by DDK-TOA CORPORATION).

A change in a metal surface before and after the test is visually evaluated by using an untested specimen of each of the metals as a comparison article. The evaluation criteria are as follows.

S: there is no change before and after the test.

A: a gloss is lost.

B: a surface slightly rusts.

x: rust is recognized on the entire surface.

TABLE 1

| Example | Stabilizer (B) Compound name | Mass proportion (mass ppm) | pH Before test | pH After test | Appearance after metal corrosion resistance test |
|---|---|---|---|---|---|
| 1 | 253fb | 10 | 7.0 | 7.0 | S |
| 2 | 253fb | 1 | 7.0 | 3.4 | A |
| 3 | 253fb | 3 | 7.0 | 6.0 | S |
| 4 | 253fb | 5 | 7.0 | 7.0 | S |
| 5 | 253fb | 100 | 7.0 | 7.0 | S |
| 6 | 253fb | 1000 | 7.0 | 7.0 | S |
| 7 | 253fb | 10000 | 7.0 | 7.0 | S |
| 8 | 225ca | 10 | 7.0 | 7.0 | S |
| 9 | 225ca | 1 | 7.0 | 3.6 | A |
| 10 | 225ca | 3 | 7.0 | 6.1 | S |
| 11 | 225ca | 5 | 7.0 | 7.0 | S |
| 12 | 225ca | 100 | 7.0 | 7.0 | S |
| 13 | 225ca | 1000 | 7.0 | 7.0 | S |
| 14 | 225ca | 10000 | 7.0 | 7.0 | S |
| 15 | 225cb | 10 | 7.0 | 7.0 | S |
| 16 | 225cb | 1 | 7.0 | 3.5 | A |
| 17 | 225cb | 3 | 7.0 | 6.2 | S |
| 18 | 225cb | 5 | 7.0 | 7.0 | S |
| 19 | 225cb | 100 | 7.0 | 7.0 | S |
| 20 | 225cb | 1000 | 7.0 | 7.0 | S |
| 21 | 225cb | 10000 | 7.0 | 7.0 | S |
| 22 | 225ca/cb mixture | 10 | 7.0 | 7.0 | S |
| 23 | 225ca/cb mixture | 1 | 7.0 | 4.0 | A |
| 24 | 225ca/cb mixture | 3 | 7.0 | 6.3 | S |
| 25 | 225ca/cb mixture | 5 | 7.0 | 7.0 | S |
| 26 | 225ca/cb mixture | 100 | 7.0 | 7.0 | S |
| 27 | 225ca/cb mixture | 1000 | 7.0 | 7.0 | S |
| 28 | 225ca/cb mixture | 10000 | 7.0 | 7.0 | S |
| 29 | 253db | 10 | 7.0 | 7.0 | S |
| 30 | 253db | 1 | 7.0 | 3.6 | A |
| 31 | 253db | 3 | 7.0 | 5.9 | S |
| 32 | 253db | 5 | 7.0 | 7.0 | S |
| 33 | 253db | 100 | 7.0 | 7.0 | S |
| 34 | 253db | 1000 | 7.0 | 7.0 | S |
| 35 | 253db | 10000 | 7.0 | 7.0 | S |
| 36 | No Stabilizer | — | 7.0 | 1.6 | x |

From Table 1, it is found that in any of the solvent compositions in the examples of the present invention, acidification is suppressed as compared with the comparative example. In addition, it is found that corrosion of the metal test pieces is suppressed in the examples rather than in the comparative example. This makes it obvious that the solvent composition of the present invention not only achieves a stabilization effect of an excellent solvent composition but also is capable of suppressing the metal corrosion.

2. Continuous Operation Test with Cleaning Machine

A cleaning test is performed by applying the above-described solvent compositions in Examples 1 to 36 to a cleaning apparatus 10 similar to the one illustrated in FIG. 1. 50 kg of each of the solvent compositions in Examples 1 to 36 is put in a cleaning tank 1, a rinse tank 2, and a vapor generation tank 3 of the cleaning apparatus 10, and a circulation operation is performed by each of them for 300 hours. 100 g of each of solvents in the vapor generation tank 3, the cleaning tank 1, and a water separation tank 5 is collected before an operation start (initial stage) and after 10 hours, 100 hours, and 300 hours after the operation start, and a chlorine ion concentration and a pH are measured by the following method. Tables 2 to 5 present the results. In Tables 2 to 5, a tank 3 means the vapor generation tank 3, a tank 1 means the cleaning tank 1, and a tank 5 means the water separation tank 5, respectively.

(pH Measurement)

40 g of the solvent composition to be obtained by collection and 40 g of pure water prepared at pH 7 are put in a 200 mL-capacity reparatory funnel and shaken for one minute. Thereafter, they are left still, and a water layer being an upper layer obtained by a two-layer separation is separately collected, and a pH of the water layer is measured by the same pH meter as the above-described one.

(Chlorine Ion Concentration Measurement)

After putting 50 g of the solvent composition to be obtained by collection in a 100 mL sample bottle, 50 g of ion-exchange water is added thereto and shaken by hand for 30 seconds, thereby extracting chlorine ions included in the solvent composition into the ion-exchange water. After standing still and separating the ion-exchange water, the chlorine ion concentration (ppm) included in the ion-exchange water is measured by an ion chromatography (ICS-1000, manufactured by NIPPON DIONEX K.K.).

TABLE 2

| | Stabilizer (B) | | | pH measurement | | | | Chlorine ion concentration measurement (ppm) | | | |
|---|---|---|---|---|---|---|---|---|---|---|---|
| Example | Compound name | Mass proportion (mass ppm) | Collection point | Initial stage | After 10 hours | After 100 hours | After 300 hours | Initial stage | After 10 hours | After 100 hours | After 300 hours |
| 1 | 253fb | 10 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 6.9 | 7.0 | <0.1 | <0.1 | <0.1 | <0.1 |
| 2 | 253fb | 1 | Tank 3 | 7.0 | 7.0 | 6.2 | 5.6 | <0.1 | <0.1 | 3.0 | 5.0 |
| | | | Tank 1 | 7.0 | 7.0 | 6.5 | 6.0 | <0.1 | <0.1 | 2.5 | 3.0 |
| | | | Tank 5 | 7.0 | 7.0 | 6.4 | 5.9 | <0.1 | <0.1 | 2.6 | 3.2 |
| 3 | 253fb | 3 | Tank 3 | 7.0 | 7.0 | 6.7 | 6.4 | <0.1 | <0.1 | 1.5 | 2.5 |
| | | | Tank 1 | 7.0 | 7.0 | 6.9 | 6.6 | <0.1 | <0.1 | 1.2 | 2.0 |
| | | | Tank 5 | 7.0 | 7.0 | 7.0 | 6.6 | <0.1 | <0.1 | 1.2 | 2.0 |
| 4 | 253fb | 5 | Tank 3 | 7.0 | 7.0 | 6.9 | 6.5 | <0.1 | <0.1 | <0.1 | 2.0 |
| | | | Tank 1 | 7.0 | 7.0 | 7.0 | 6.7 | <0.1 | <0.1 | <0.1 | 1.5 |
| | | | Tank 5 | 7.0 | 7.0 | 7.0 | 6.7 | <0.1 | <0.1 | <0.1 | 1.5 |
| 5 | 253fb | 100 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 6 | 253fb | 1000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 7 | 253fb | 10000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 8 | 225ca | 10 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 9 | 225ca | 1 | Tank 3 | 7.0 | 7.0 | 6.3 | 5.8 | <0.1 | <0.1 | 2.8 | 4.6 |
| | | | Tank 1 | 7.0 | 7.0 | 6.5 | 6.1 | <0.1 | <0.1 | 2.4 | 2.8 |
| | | | Tank 5 | 7.0 | 7.0 | 6.5 | 6.0 | <0.1 | <0.1 | 2.4 | 3.0 |

TABLE 3

| | Stabilizer (B) | | | pH measurement | | | | Chlorine ion concentration measurement (ppm) | | | |
|---|---|---|---|---|---|---|---|---|---|---|---|
| Example | Compound name | Mass proportion (mass ppm) | Collection point | Initial stage | After 10 hours | After 100 hours | After 300 hours | Initial stage | After 10 hours | After 100 hours | After 300 hours |
| 10 | 225ca | 3 | Tank 3 | 7.0 | 7.0 | 6.8 | 6.5 | <0.1 | <0.1 | 1.5 | 2.3 |
| | | | Tank 1 | 7.0 | 7.0 | 6.9 | 6.7 | <0.1 | <0.1 | 1.0 | 1.8 |
| | | | Tank 5 | 7.0 | 7.0 | 7.0 | 6.6 | <0.1 | <0.1 | 1.0 | 1.8 |
| 11 | 225ca | 5 | Tank 3 | 7.0 | 7.0 | 6.9 | 6.6 | <0.1 | <0.1 | <0.1 | 1.7 |
| | | | Tank 1 | 7.0 | 7.0 | 7.0 | 6.7 | <0.1 | <0.1 | <0.1 | 1.7 |
| | | | Tank 5 | 7.0 | 7.0 | 7.0 | 6.7 | <0.1 | <0.1 | <0.1 | 1.6 |
| 12 | 225ca | 100 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 13 | 225ca | 1000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 14 | 225ca | 10000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |

TABLE 3-continued

| | Stabilizer (B) | | | pH measurement | | | | Chlorine ion concentration measurement (ppm) | | | |
|---|---|---|---|---|---|---|---|---|---|---|---|
| Example | Compound name | Mass proportion (mass ppm) | Collection point | Initial stage | After 10 hours | After 100 hours | After 300 hours | Initial stage | After 10 hours | After 100 hours | After 300 hours |
| 15 | 225cb | 10 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 16 | 225cb | 1 | Tank 3 | 7.0 | 7.0 | 6.3 | 5.7 | <0.1 | <0.1 | 3.0 | 4.8 |
| | | | Tank 1 | 7.0 | 7.0 | 6.5 | 6.0 | <0.1 | <0.1 | 2.4 | 3.0 |
| | | | Tank 5 | 7.0 | 7.0 | 6.5 | 6.0 | <0.1 | <0.1 | 2.4 | 3.0 |
| 17 | 225cb | 3 | Tank 3 | 7.0 | 7.0 | 6.7 | 6.4 | <0.1 | <0.1 | 1.4 | 2.4 |
| | | | Tank 1 | 7.0 | 7.0 | 6.9 | 6.7 | <0.1 | <0.1 | 1.1 | 2.0 |
| | | | Tank 5 | 7.0 | 7.0 | 7.0 | 6.6 | <0.1 | <0.1 | 1.1 | 2.0 |
| 18 | 225cb | 5 | Tank 3 | 7.0 | 7.0 | 7.0 | 6.6 | <0.1 | <0.1 | <0.1 | 1.9 |
| | | | Tank 1 | 7.0 | 7.0 | 7.0 | 6.8 | <0.1 | <0.1 | <0.1 | 1.4 |
| | | | Tank 5 | 7.0 | 7.0 | 7.0 | 6.7 | <0.1 | <0.1 | <0.1 | 1.3 |

TABLE 4

| | Stabilizer (B) | | | pH measurement | | | | Chlorine ion concentration measurement (ppm) | | | |
|---|---|---|---|---|---|---|---|---|---|---|---|
| Example | Compound name | Mass proportion (mass ppm) | Collection point | Initial stage | After 10 hours | After 100 hours | After 300 hours | Initial stage | After 10 hours | After 100 hours | After 300 hours |
| 19 | 225cb | 100 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 20 | 225cb | 1000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 21 | 225cb | 10000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 22 | 225ca/cb mixture | 10 | Tank 3 | 7.0 | 7.0 | 7.0 | 7.0 | <0.1 | <0.1 | <0.1 | <0.1 |
| | | | Tank 1 | 7.0 | 7.0 | 6.9 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 23 | 225ca/cb mixture | 1 | Tank 3 | 7.0 | 7.0 | 6.3 | 5.7 | <0.1 | <0.1 | 2.8 | 4.8 |
| | | | Tank 1 | 7.0 | 7.0 | 6.6 | 6.2 | <0.1 | <0.1 | 2.4 | 2.8 |
| | | | Tank 5 | 7.0 | 7.0 | 6.6 | 5.9 | <0.1 | <0.1 | 2.6 | 3.2 |
| 24 | 225ca/cb mixture | 3 | Tank 3 | 7.0 | 7.0 | 6.7 | 6.4 | <0.1 | <0.1 | 1.6 | 2.6 |
| | | | Tank 1 | 7.0 | 7.0 | 6.9 | 6.6 | <0.1 | <0.1 | 1.1 | 2.0 |
| | | | Tank 5 | 7.0 | 7.0 | 7.0 | 6.6 | <0.1 | <0.1 | 1.2 | 2.1 |
| 25 | 225ca/cb mixture | 5 | Tank 3 | 7.0 | 7.0 | 6.9 | 6.5 | <0.1 | <0.1 | <0.1 | 2.1 |
| | | | Tank 1 | 7.0 | 7.0 | 7.0 | 6.7 | <0.1 | <0.1 | <0.1 | 1.4 |
| | | | Tank 5 | 7.0 | 7.0 | 7.0 | 6.7 | <0.1 | <0.1 | <0.1 | 1.4 |
| 26 | 225ca/cb mixture | 100 | Tank 3 | 7.0 | 6.9 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |
| 27 | 225ca/cb mixture | 1000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |

TABLE 5

| | Stabilizer (B) | | | pH measurement | | | | Chlorine ion concentration measurement (ppm) | | | |
|---|---|---|---|---|---|---|---|---|---|---|---|
| Example | Compound name | Mass proportion (mass ppm) | Collection point | Initial stage | After 10 hours | After 100 hours | After 300 hours | Initial stage | After 10 hours | After 100 hours | After 300 hours |
| 28 | 225ca/cb mixture | 10000 | Tank 3 | 7.0 | 7.0 | 7.0 | 7.0 | <0.1 | <0.1 | <0.1 | <0.1 |
| | | | Tank 1 | 7.0 | 7.0 | 7.0 | 7.0 | <0.1 | <0.1 | <0.1 | <0.1 |
| | | | Tank 5 | 7.0 | 7.0 | 7.0 | 7.0 | <0.1 | <0.1 | <0.1 | <0.1 |

TABLE 5-continued

| Example | Stabilizer (B) Compound name | Mass proportion (mass ppm) | Collection point | pH measurement Initial stage | After 10 hours | After 100 hours | After 300 hours | Chlorine ion concentration measurement (ppm) Initial stage | After 10 hours | After 100 hours | After 300 hours |
|---|---|---|---|---|---|---|---|---|---|---|---|
| 29 | 253db | 10 | Tank 3 | 7.0 | 7.0 | 7.0 | 7.0 | <0.1 | <0.1 | <0.1 | <0.1 |
|   |   |   | Tank 1 | 7.0 | 7.0 | 7.0 | 7.0 | <0.1 | <0.1 | <0.1 | <0.1 |
|   |   |   | Tank 5 | 7.0 | 7.0 | 6.9 | 7.0 | <0.1 | <0.1 | <0.1 | <0.1 |
| 30 | 253db | 1 | Tank 3 | 7.0 | 7.0 | 6.1 | 5.5 | <0.1 | <0.1 | 3.2 | 4.9 |
|   |   |   | Tank 1 | 7.0 | 7.0 | 6.4 | 5.9 | <0.1 | <0.1 | 2.6 | 3.6 |
|   |   |   | Tank 5 | 7.0 | 7.0 | 6.3 | 5.9 | <0.1 | <0.1 | 2.6 | 3.3 |
| 31 | 253db | 3 | Tank 3 | 7.0 | 7.0 | 6.8 | 6.5 | <0.1 | <0.1 | 1.4 | 2.4 |
|   |   |   | Tank 1 | 7.0 | 7.0 | 6.8 | 6.5 | <0.1 | <0.1 | 1.1 | 1.9 |
|   |   |   | Tank 5 | 7.0 | 7.0 | 7.0 | 6.6 | <0.1 | <0.1 | 1.2 | 2.1 |
| 32 | 253db | 5 | Tank 3 | 7.0 | 7.0 | 7.0 | 6.5 | <0.1 | <0.1 | <0.1 | 2.0 |
|   |   |   | Tank 1 | 7.0 | 7.0 | 7.0 | 6.6 | <0.1 | <0.1 | <0.1 | 1.7 |
|   |   |   | Tank 5 | 7.0 | 7.0 | 7.0 | 6.6 | <0.1 | <0.1 | <0.1 | 1.7 |
| 33 | 253db | 100 | Tank 3 | 7.0 | 7.0 | 7.0 | 7.0 | <0.1 | <0.1 | <0.1 | <0.1 |
|   |   |   | Tank 1 | 7.0 | 7.0 | 7.0 | 7.0 | <0.1 | <0.1 | <0.1 | <0.1 |
|   |   |   | Tank 5 | 7.0 | 7.0 | 7.0 | 7.0 | <0.1 | <0.1 | <0.1 | <0.1 |
| 34 | 253db | 1000 | Tank 3 | 7.0 | 7.0 | 7.0 | 7.0 | <0.1 | <0.1 | <0.1 | <0.1 |
|   |   |   | Tank 1 | 7.0 | 7.0 | 7.0 | 7.0 | <0.1 | <0.1 | <0.1 | <0.1 |
|   |   |   | Tank 5 | 7.0 | 7.0 | 7.0 | 7.0 | <0.1 | <0.1 | <0.1 | <0.1 |
| 35 | 253db | 10000 | Tank 3 | 7.0 | 7.0 | 7.0 | 7.0 | <0.1 | <0.1 | <0.1 | <0.1 |
|   |   |   | Tank 1 | 7.0 | 7.0 | 7.0 | 7.0 | <0.1 | <0.1 | <0.1 | <0.1 |
|   |   |   | Tank 5 | 7.0 | 7.0 | 7.0 | 7.0 | <0.1 | <0.1 | <0.1 | <0.1 |
| 36 | No Stabilizer | — | Tank 3 | 7.0 | 6.0 | 4.5 | 3.2 | <0.1 | 3.0 | 30.0 | 45.0 |
|   |   |   | Tank 1 | 7.0 | 6.4 | 5.0 | 4.3 | <0.1 | 2.5 | 25.0 | 40.0 |
|   |   |   | Tank 5 | 7.0 | 6.5 | 4.9 | 4.2 | <0.1 | 2.6 | 26.0 | 41.0 |

From Tables 2 to 5 it is found that in any of the examples of the present invention, acidification is suppressed for a long stretch of time and occurrence of chloride ions due to decomposition is suppressed as compared with the solvent composition in the comparative example. From this, it is found that the solvent composition of the present invention is excellent in long-term stability in an actual cleaning apparatus.

3. Evaluation of Cleaning Ability

The above-described solvent compositions in Examples 1 to 35 (examples) and Example 36 (comparative example) are produced further, and each of the following cleaning tests is performed.

[Cleaning Test A]

After immersing a test piece (25 mm×30 min×2 mm) of stainless steel SUS304 in a product name "Daphne Magplus HT-10" (manufactured by Idemitsu Kosan Co., Ltd.) which is a cutting oil, the test piece is immersed in 50 mL of the solvent composition in each of the examples for one minute and pulled up, and degrees to which the cutting oil has been removed are observed. Evaluation of detergency is performed by the following criteria.

"S (excellent)": the cutting oil is completely removed.
"A (good)": the cutting oil is almost removed.
"B (slightly poor)": the cutting oil remains in trace amounts.
"x (poor)": the cutting oil considerably remains.

[Cleaning Test B]

A test is conducted similarly to the cleaning test A except to use a product name "Daphne Magplus AM20" (manufactured by Idemitsu Kosan Co., Ltd.) as a cutting oil, and detergency is evaluated by the same criteria.

[Cleaning Test C]

A test is conducted similarly to the cleaning test A except to use a product name "Daphne Magplus HM25" (manufactured by Idemitsu Kosan Co., Ltd.) as a cutting oil, and detergency is evaluated by the same criteria.

[Cleaning Test D]

A test is conducted similarly to the cleaning test A except to use a product name "G-6318FK" (manufactured by NIHON KOHSAKUYU CO LTD.) as a cutting oil, and detergency is evaluated by the same criteria.

Regarding the cleaning tests A to D, any evaluation of the solvent compositions in Examples 1 to 36 is S (excellent).

It is found from the above-described results that the solvent compositions in the examples of the present invention in Examples 1 to 35 are capable of sufficiently cleaning and removing the cutting oils and have excellent detergency similarly to that in Example 36 to which a stabilizer is not added, in any cleaning test.

4. Evaluation as Dilution Coating Solvent for Lubricant

The above-described solvent compositions in Examples 1 to 35 (examples) and Example 36 (comparative example) are produced further, and each of the solvent compositions and a product name "Krytox (registered trademark) GPL102" (manufactured by Du Pont Co., Ltd., fluorine-based oil) which is a fluorine-based lubricant are mixed with each other to prepare a lubricant solution in which a proportion of the content of the fluorine-based lubricant is 0.5 mass % to the total amount of the solution.

Next, on a surface of an aluminum deposited sheet in which aluminum has been deposited on a sheet made of iron, the above-described lubricant solutions are each applied in a thickness of 0.4 mm and air-dried under a condition of 19° C. to 21° C., thereby each forming a lubricant coating film on the aluminum deposited sheet surface. Evaluation as lubricant dilution coating solvents of the solvent composition of the present invention is performed as follows. As the results of the evaluation, in the cases of using the solvent compositions in Examples 1 to 36, any evaluation is S (excellent).

[Evaluation Method]

(Dissolved State)

A dissolved state of the lubricant solution using the solvent composition in each of the examples is visually confirmed to be evaluated by the following criteria.

"S (excellent)": immediately uniformly dissolved to become transparent.

"A (good)": if shaken, uniformly dissolved to become transparent.

"B (slightly poor)": slightly cloudy.

"x (poor)": cloudy or phase-separated.

(Coating Film State)

A state of the lubricant coating film formed by the lubricant solution using the solvent composition in each of the examples is visually confirmed to be evaluated by the following criteria.

"S (excellent)": a uniform coating film is formed.

"A (good)": an almost uniform coating film is formed.

"B (slightly poor)": nonuniformity is partially seen on the coating film.

"x (poor)": nonuniformity is considerably seen on the coating film.

(Drying Property)

In a drying property of the lubricant solution at a time of formation of the lubricant coating film formed by the lubricant solution using the solvent composition in each of the examples, the drying property is evaluated by the following criteria.

"S (excellent)": the solvent immediately evaporates.

"A (good)": the solvent evaporates within ten minutes.

"B (possible)": the solvent evaporates over ten minutes within one hour.

"x (poor)": the solvent remains even when one hour has passed.

The above-described solvent compositions in Examples 1 to 35 (examples) and Example 36 (comparative example) are produced further, and each of the solvent compositions and a product name "Shin-Etsu Silicone KF-96-50CS" (manufactured by Shin-Etsu Chemical Co., Ltd., silicone oil) which is a silicone-based lubricant are mixed with each other to prepare a lubricant solution in which a proportion of the content of the silicone-based lubricant is 3 mass % to the total amount of the solution.

Thereafter, lubricant coating films are each formed in a similar manner to that of the coating of the lubricant solution including the above-described solvent composition and the fluorine-based oil. The evaluation method and the evaluation criteria are similar to the evaluation in the coating of the lubricant solution including the above-described solvent composition and the fluorine-based oil. As the results of the evaluation, in the cases of using the solvent compositions in Examples 1 to 36, any evaluation is S (excellent).

It is found from the above-described results that the solvent compositions in the examples of the present invention in Examples 1 to 35 are excellent in solubility of the lubricant and have a sufficient drying property, and are capable of simply forming a uniform lubricant coating film similarly to the solvent composition in Example 36 in which a stabilizer is not included, in any coating test.

A solvent composition of the present invention is a stable solvent composition which is excellent in solubility of various organic substances, has a sufficient drying property, and has no adverse effect on a global environment, is stabilized not to decompose, and moreover suppresses metal corrosion under coexistence with metal, and can be used without having an adverse effect on articles made of various materials such as metal, plastic, elastomer, and fabric in a wide range of industrial uses such as a cleaning solvent, a dilution coating solvent, and a spraying agent composition.

What is claimed is:

1. A solvent composition consisting of:
   (A) (Z)-1-chloro-3,3,3-trifluoro-1-propene;
   (B) a saturated hydrochlorofluorocarbon whose boiling point at normal pressure is not lower than 30° C. or higher than 60° C.;
   (C) optionally at least one solvent selected from the group consisting of a hydrocarbon, an alcohol, a ketone, an ester, a chlorocarbon, a hydrofluorocarbon, and a hydrofluoroether; and
   (D) optionally one or more other stabilizers,
   wherein the saturated hydrochlorofluorocarbon is one or more selected from the group consisting of 1-chloro-3,3,3-trifluoropropane, 1,1-dichloro-2,2,3,3,3-pentafluoropropane, and 1,3-dichloro-1,1,2,2,3-pentafluoropropane.

2. The solvent composition according to claim 1, wherein a content of the saturated hydrochlorofluorocarbon, relative to a content of the solvent, is 1 mass ppm to 1 mass %.

3. The solvent composition according to claim 1, wherein a a content of the saturated hydrochlorofluorocarbon, relative to a content of (Z)-1-chloro-3,3,3-trifluoro-1-propene, is 1 mass ppm to 1 mass %.

4. The solvent composition according to claim 1, wherein a content of (Z)-1-chloro-3,3,3-trifluoro-1-propene, relative to a total amount of the solvent, is 80 to 100 mass %.

5. A cleaning method comprising bringing the solvent composition according to claim 1 and an article to be cleaned into contact with each other.

6. The cleaning method according to claim 5, wherein a processing oil adhering to the article to be cleaned is cleaned.

7. The cleaning method according to claim 6, wherein the processing oil is one or more selected from the group consisting of a cutting oil, a quenching oil, a rolling oil, a lubricating oil, a machine oil, a presswork oil, a stamping oil, a drawing oil, an assembly oil, and a wire drawing oil.

8. The cleaning method according to claim 7, wherein the article to be cleaned is clothing.

9. A method of forming a coating film, the method comprising
   dissolving a nonvolatile organic compound in the solvent composition according to claim 1 to prepare a coating film-forming composition,
   applying the coating film-forming composition to an article to be coated, and
   subsequently evaporating the solvent composition to form a coating film consisting of the nonvolatile organic compound.

* * * * *